(12) United States Patent
Matsumoto et al.

(10) Patent No.: US 10,287,749 B2
(45) Date of Patent: May 14, 2019

(54) CAB AND WORK VEHICLE

(71) Applicant: KOMATSU LTD., Tokyo (JP)

(72) Inventors: Jun Matsumoto, Hirakata (JP); Masamichi Miyazaki, Neyagawa (JP); Shinji Hirose, Osaka (JP); Masashi Hoshino, Hirakata (JP)

(73) Assignee: KOMATSU LTD., Minato-ku, Tokyo (JP)

( * ) Notice: Subject to any disclaimer, the term of this patent is extended or adjusted under 35 U.S.C. 154(b) by 178 days.

(21) Appl. No.: 15/117,479

(22) PCT Filed: Feb. 19, 2016

(86) PCT No.: PCT/JP2016/054818
§ 371 (c)(1),
(2) Date: Aug. 9, 2016

(87) PCT Pub. No.: WO2017/141419
PCT Pub. Date: Aug. 24, 2017

(65) Prior Publication Data
US 2018/0051441 A1    Feb. 22, 2018

(51) Int. Cl.
| | |
|---|---|
| *B62D 33/06* | (2006.01) |
| *E02F 9/16* | (2006.01) |
| *E02F 9/26* | (2006.01) |
| *B60N 2/14* | (2006.01) |
| *B60K 13/02* | (2006.01) |
| *B60N 3/08* | (2006.01) |
| *B60N 3/10* | (2006.01) |
| *B60N 3/14* | (2006.01) |

(52) U.S. Cl.
CPC ............ *E02F 9/16* (2013.01); *B60N 2/14* (2013.01); *B62D 33/06* (2013.01); *E02F 9/26* (2013.01); *B60K 13/02* (2013.01); *B60N 3/083* (2013.01); *B60N 3/10* (2013.01); *B60N 3/14* (2013.01); *B60Y 2200/411* (2013.01)

(58) Field of Classification Search
CPC ....... B66F 9/0759; B60K 35/00; B60K 37/02; B60R 11/02; B60R 11/0235
See application file for complete search history.

(56) References Cited

U.S. PATENT DOCUMENTS

| | | | |
|---|---|---|---|
| 6,172,613 B1 * | 1/2001 | DeLine ................. | B60K 35/00 248/549 |
| 2005/0193603 A1 | 9/2005 | Schultz et al. | |
| 2010/0079301 A1 | 4/2010 | Rossaert | |

(Continued)

FOREIGN PATENT DOCUMENTS

| | | |
|---|---|---|
| JP | 2000-247572 A | 9/2000 |
| JP | 2004-076499 A | 3/2004 |

(Continued)

*Primary Examiner* — Bryan A Evans
(74) *Attorney, Agent, or Firm* — Drinker Biddle & Reath LLP (57) ABSTRACT

A cab includes a dash panel disposed frontward of an operator's seat, and a monitor device disposed above the dash panel. The whole of the monitor device in the right-left direction overlaps a first front window when the monitor device is seen in the front-rear direction. The monitor device is disposed at a position at which the whole of the monitor device overlaps the first front window when the monitor device is seen in the front-rear direction.

6 Claims, 8 Drawing Sheets

(56) References Cited

U.S. PATENT DOCUMENTS

| | | | |
|---|---|---|---|
| 2011/0049932 A1* | 3/2011 | Hobenshield | B62D 33/0617 296/190.1 |
| 2012/0086236 A1* | 4/2012 | Nagami | B60H 1/00378 296/190.09 |
| 2012/0234617 A1 | 9/2012 | Suneya et al. | |
| 2014/0257645 A1 | 9/2014 | Date | |
| 2014/0291057 A1 | 10/2014 | Nakagami et al. | |

FOREIGN PATENT DOCUMENTS

| | | |
|---|---|---|
| JP | 2013-104236 A | 5/2013 |
| JP | 5409971 B1 | 2/2014 |
| WO | WO-2012/086773 A1 | 6/2012 |

* cited by examiner

FIG.8

CAB AND WORK VEHICLE

TECHNICAL FIELD

The present invention relates to a cab and a work vehicle equipped with the cab.

BACKGROUND ART

Japanese Patent Laying-Open No. 2013-104236 (PTD 1) discloses that a display device such as liquid crystal display is disposed in a cab of a bulldozer and the display device is capable of displaying various kinds of information such as engine coolant temperature and hydraulic oil pressure.

CITATION LIST

Patent Document

PTD 1: Japanese Patent Laying-Open No. 2013-104236

SUMMARY OF INVENTION

Technical Problem

Recently, a construction system for a work vehicle has been known, according to which information about a designed landform is externally acquired and then the position of a work implement is detected and, based on the information about the designed landform and the detected position of the work implement, the work implement is automatically controlled. Due to a large amount of information for this new construction, the conventional display device cannot sufficiently display the information. Thus, there has been a demand for a monitor device to be newly disposed in the cab.

During construction, an operator aboard the cab is watching the work implement. It is necessary to dispose the monitor device at a position that enables the operator to see the monitor device easily during construction.

An object of the present invention is to provide a cab in which an operator can easily see the monitor device during work as well as a work vehicle equipped with the cab.

Solution to Problem

A cab of the present invention is a cab for a work vehicle, and the cab includes an operator's seat, a first front window, a second front window, a third front window, a dash panel, and a monitor device. The operator's seat is disposed in the cab. The first front window is provided in a central part of a front portion of the cab. The second front window is provided to incline obliquely rearward to right with respect to the first front window. The third front window is provided to incline obliquely rearward to left with respect to the first front window. The dash panel is disposed in the cab and located frontward of the operator's seat. The monitor device is disposed above the dash panel. A whole of the monitor device in a right-left direction overlaps the first front window when the monitor device is seen in a front-rear direction.

In the cab, the monitor device is disposed at a position at which a whole of the monitor device overlaps the first front window when the monitor device is seen in the front-rear direction.

The first front window of the cab includes a pair of a right side edge and a left side edge each extending in a top-bottom direction. The cab further includes a wire harness connected to the monitor device. The wire harness is disposed along one of the right side edge and the left side edge.

In the cab, an upper edge of the monitor device is located higher than a center of the first front window in a top-bottom direction.

In the cab, the dash panel includes a second monitor device.

A work vehicle of the present invention includes a cab and a work implement disposed frontward of the cab. The cab includes an operator's seat, a first front window, a second front window, a third front window, a dash panel, and a monitor device. The operator's seat is disposed in the cab. The first front window is provided in a central part of a front portion of the cab. The second front window is provided to incline obliquely rearward to right with respect to the first front window. The third front window is provided to incline obliquely rearward to left with respect to the first front window. The dash panel is disposed in the cab and located frontward of the operator's seat. The monitor device is disposed above the dash panel. A whole of the monitor device in a right-left direction overlaps the first front window when the monitor device is seen in a front-rear direction.

The work vehicle further includes an engine, an engine hood covering the engine, and an intake pipe for intake air to flow in the intake pipe toward the engine. The intake pipe is located frontward of the cab and protrudes upward from the engine hood. The monitor device overlaps the intake pipe as seen in a front-rear direction.

In the work vehicle, an upper edge of the monitor device is located lower than an upper end of the intake pipe.

In the work vehicle, an upper edge of the monitor device is located higher than a center of the first front window in a top-bottom direction.

Advantageous Effects of Invention

The cab of the present invention enables an operator to easily see the monitor device during work.

DESCRIPTION OF EMBODIMENTS

In the following, embodiments of the present invention will be described based on the drawings.

Initially, a description will be given of a configuration of a bulldozer to which the concept of the present invention is applicable.

Figure 1:
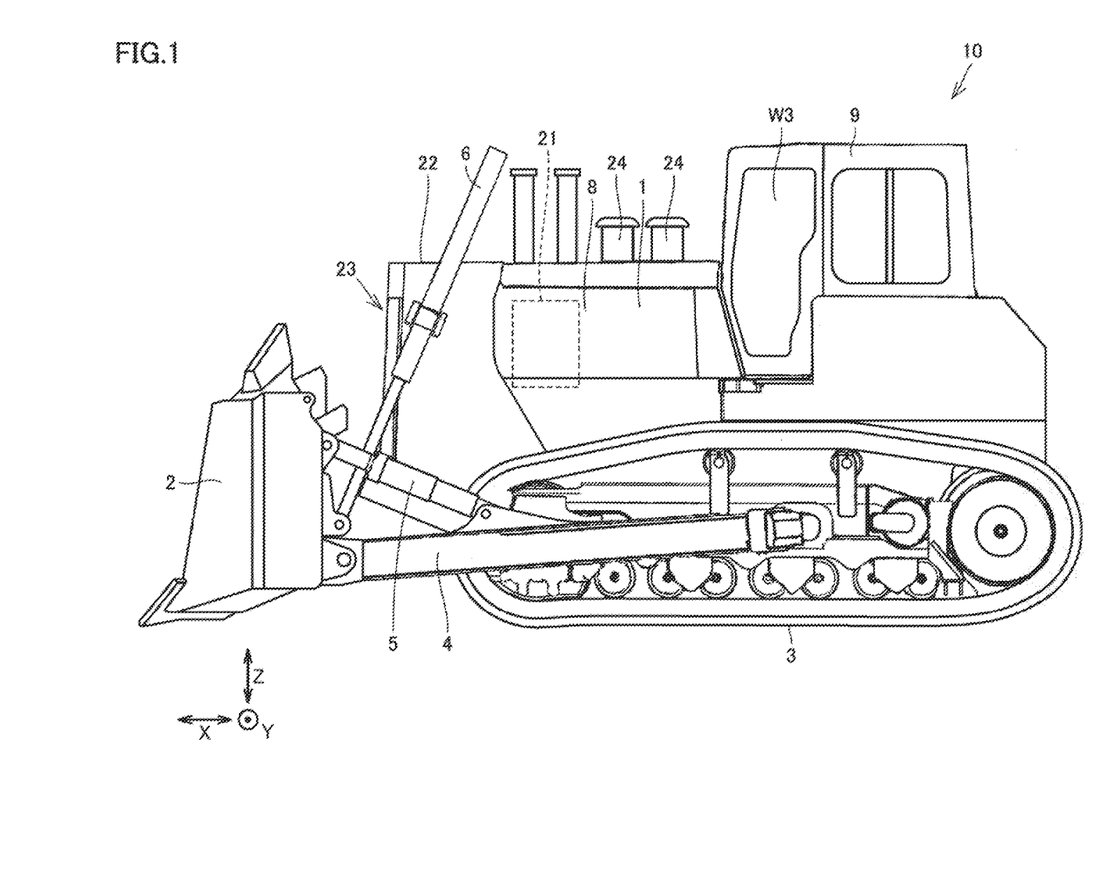
FIG. 1 is a side view schematically showing a configuration of a bulldozer in one embodiment of the present invention.
Figure 2:
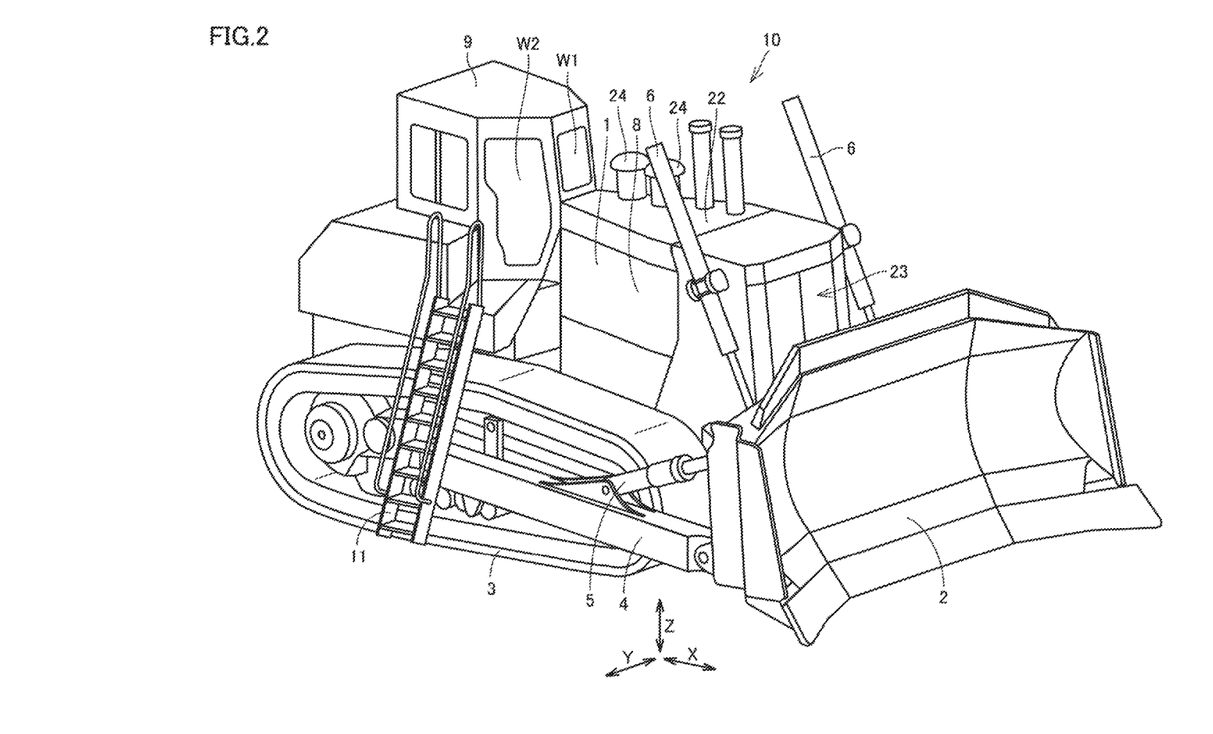
FIG. 2 is a perspective view schematically showing the configuration of the bulldozer in one embodiment of the present invention.

FIG. 1 is a side view schematically showing a configuration of a bulldozer 10 in one embodiment of the present invention. FIG. 2 is a perspective view schematically showing the configuration of bulldozer 10 in one embodiment of the present invention. As shown in FIGS. 1 and 2, bulldozer 10 of the present embodiment mainly includes a vehicular body 1, a blade 2, and a traveling device. The traveling device has a pair of right and left crawler type carriers 3 separated from each other in the vehicular width direction. Vehicular body 1 is disposed between the paired right and left crawler type carriers 3. Blade 2 is disposed at a frontward position of vehicular body 1.

Vehicular body 1 has a cab (operator's cab) 9 and an engine compartment 8. Cab 9 is disposed in an upper rear portion of vehicular body 1. An operator operating bulldozer 10 is aboard cab 9. Cab 9 has, in its inside, an operator's seat for an operator to sit, and is configured to surround the operator's seat.

Engine compartment 8 is disposed frontward of cab 9. Engine compartment 8 is disposed between cab 9 and blade 2. In engine compartment 8, an engine 21 is housed. Engine 21 is covered with an engine hood 22 located above engine 21. Engine hood 22 forms a ceiling portion of engine compartment 8. Engine hood 22 separates the outside and the inside of engine compartment 8 from each other.

In the present embodiment, the direction in which bulldozer 10 travels straight forward is referred to as front-rear direction of bulldozer 10. In the front-rear direction of bulldozer 10, the direction in which blade 2 protrudes from vehicular body 1 is referred to as frontward direction. In the front-rear direction of bulldozer 10, the direction opposite to the frontward direction is referred to as rearward direction. The right-left direction of bulldozer 10 is the direction orthogonal to the front-rear direction as seen in plan view. From the viewpoint in the frontward direction, the right side and the left side in the right-left direction are respectively rightward direction and leftward direction. The top-bottom direction of bulldozer 10 is the direction orthogonal to a plane defined by the front-rear direction and the right-left direction. In the top-bottom direction, the ground side is lower side and the sky side is upper side.

The front-rear direction is the front-rear direction with respect to an operator sitting on the operator's seat in cab 9. The right-left direction is the right-left direction with respect to an operator sitting on the operator's seat. The right-left direction is the vehicular width direction of bulldozer 10. The top-bottom direction is the top-bottom direction with respect to an operator sitting on the operator's seat. The direction in which an operator sitting on the operator's seat faces is the frontward direction, and the backward direction with respect to an operator sitting on the operator's seat is the rearward direction. The right side and the left side with respect to an operator sitting on the operator's seat and facing frontward are respectively the rightward direction and the leftward direction. The feet side and the head side of an operator sitting on the operator's seat are respectively the lower side and the upper side.

In the following drawings, the front-rear direction is indicated by an arrow X, the right-left direction is indicated by an arrow Y, and the top-bottom direction is indicated by an arrow Z.

An intake pipe 24 is disposed frontward of cab 9. Intake pipe 24 is provided to protrude upward from engine hood 22. Air is taken to flow through intake pipe 24 toward engine 21.

The air outside engine compartment 8 flows through intake pipe 24 to be supplied to engine 21.

Bulldozer 10 includes blade 2 located frontward as a work implement. Blade 2 is a work implement for performing work such as excavating earth and sand and grading. Blade 2 is supported at each of its right side and left side by a frame 4. Frame 4 is a member in the shape of a quadrangular prism. One end of frame 4 is attached to the back surface of blade 2 by a rotatable support. The other end of frame 4 is supported on a side surface of the traveling device.

Blade 2 is actuated by a tilt cylinder 5 and a lift cylinder 6. One end of tilt cylinder 5 is supported on the back surface of blade 2. The other end of tilt cylinder 5 is supported on the upper surface of frame 4. Tilt cylinder 5 is extended/contracted by hydraulic pressure to cause the top end of blade 2 to move in the front-rear direction about the support with which frame 4 is attached to blade 2. Accordingly, the tilt angle of blade 2 is changed.

One end of lift cylinder 6 is supported on the back surface of blade 2. An intermediate portion of lift cylinder 6 is supported on a side surface of vehicular body 1. Lift cylinder 6 is extended/contracted by hydraulic pressure to cause blade 2 to move in the top-bottom direction about the other end of frame 4.

Bulldozer 10 may include a ripper device behind vehicular body 1 as another work implement.

A front grille 23 is attached to vehicular body 1. Front grille 23 is disposed at the front end of vehicular body 1. Front grille 23 is disposed to cover an opening formed at the front end of vehicular body 1. Blade 2 is disposed frontward of and spaced from front grille 23.

For cab 9, an access device 11 may be disposed at the right side in the right-left direction of vehicular body 1. Access device 11 is for example a ladder or a stepladder. Access device 11 constitutes a part of the path connecting the ground to cab 9. Access device 11 forms a passage for an operator to get on cab 9 or get off cab 9.

Figure 3:
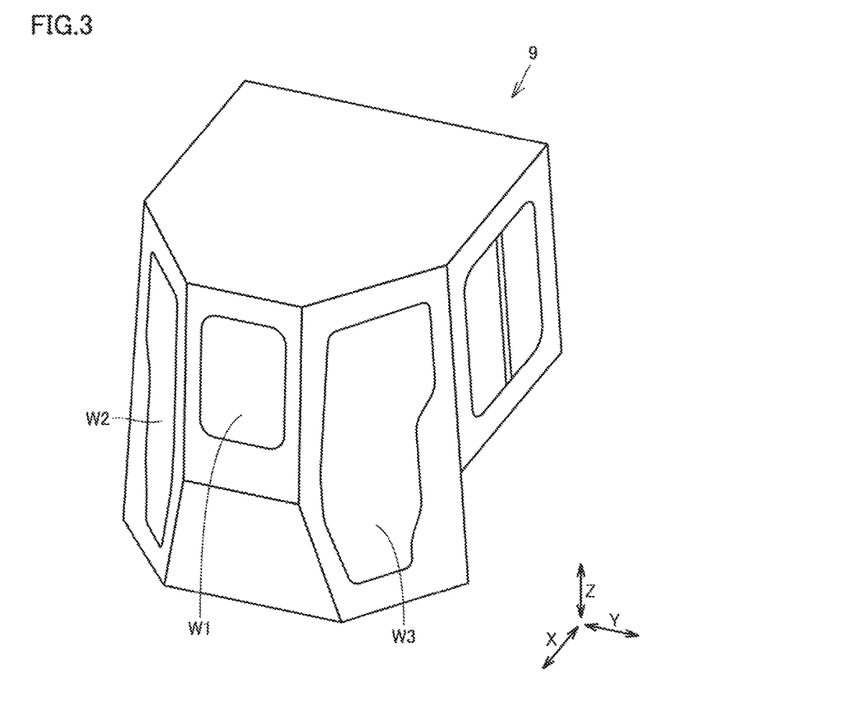
FIG. 3 is a perspective view generally showing a shape of a cab shown in FIG. 1.

FIG. 3 is a perspective view generally showing a shape of cab 9 shown in FIG. 1. As shown in FIG. 3, cab 9 is substantially hexagonal in shape as seen in plan view. Cab 9 is formed in a substantially rectangular shape with two corners beveled as seen in plan view. The resultant pair of beveled planes and the plane located between these beveled planes of the pair constitute a front portion of cab 9. The beveled planes of the pair are each provided to incline rearward as the distance from the plane between the beveled planes increases.

Cab 9 has a first front window W1, a second front window W2, and a third front window W3. First front window W1, second front window W2, and third front window W3 are formed of a transparent material such as glass so that an operator aboard cab 9 can see frontward of cab 9.

First front window W1 is provided in a central part of the front portion of cab 9. Second front window W2 is provided in a right part of the front portion of cab 9. Second front window W2 is provided to incline obliquely rearward to right with respect to first front window W1. Third front window W3 is provided in a left part of the front portion of cab 9. Third front window W3 is provided to incline obliquely rearward to left with respect to first front window W1. First front window W1 is located between second front window W2 and third front window W3.

The central part of the front portion of cab 9 in which first front window W1 is provided extends in the right-left direction. The right part of the front portion of cab 9 in which second front window W2 is provided extends obliquely with respect to the front-rear direction and the right-left direction, so that the right part extends rearward from the central part toward the right edge of cab 9. The left part of the front portion of cab 9 in which third front window W3 is provided extends obliquely with respect to the front-rear direction and the right-left direction, so that the left part extends rearward from the central part toward the left edge of cab 9.

As shown in FIG. 2, engine hood 22 is disposed frontward of cab 9. Therefore, the lower edge of first front window W1 is located at a higher level than the floor surface of cab 9. In contrast, respective lower edges of second front window W2 and third front window W3 are located near the floor surface of cab 9.

Figure 4:
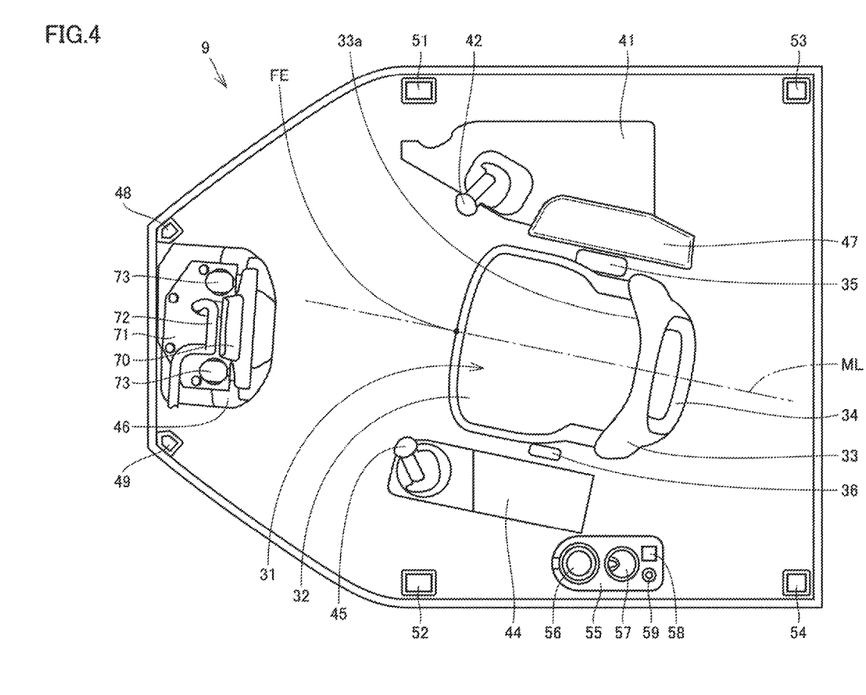
FIG. 4 is a plan view schematically showing a configuration of an inside of the cab.

FIG. 4 is a plan view schematically showing a configuration of an inside of cab 9. As shown in FIG. 4, an operator's seat 31 is disposed inside cab 9. Cab 9 has a roof portion disposed to cover operator's seat 31 and a plurality of pillars supporting the roof portion. Each pillar extends in the top-bottom direction (Z direction) and is coupled to the floor portion and the roof portion of cab 9.

The plurality of pillars include front pillars 48, 49, middle pillars 51, 52, and rear pillars 53, 54. Front pillars 48, 49 are disposed at the right side and the left side respectively of first front window W1. Middle pillars 51, 52 are disposed frontward in the front-rear direction (X direction) with respect to operator's seat 31 Rear pillars 53, 54 are disposed rearward in the front-rear direction (X direction) with respect to operator's seat 31. Front pillar 48, middle pillar 51, and rear pillar 53 are disposed rightward in the vehicular width direction (Y direction) with respect to operator's seat 31. Front pillar 49, middle pillar 52, and rear pillar 54 are disposed leftward in the vehicular width direction (Y direction) with respect to operator's seat 31.

Operator's seat 31 is disposed substantially at the center of cab 9. Operator's seat 31 has a seat portion 32, a back portion 33, and a headrest 34. An operator aboard cab 9 sits on seat portion 32. Back portion 33 is provided for the operator sitting on seat portion 32 to rest the operator's back on the back portion. A side support protruding frontward is provided at each of the right end and the left end of back portion 33 so as to immovably support the sitting operator. To the top end of back portion 33, headrest 34 is attached. Headrest 34 protects the head of the operator from impact.

On the right side of operator's seat 31 in cab 9, a right console 41 is disposed. On right console 41, a lever for controlling the work implement is provided. To right console 41, a blade control lever 42 for controlling blade 2 is attached. Blade control lever 42 is disposed at a front portion of right console 41.

On the right side of operator's seat 31 in cab 9, a right armrest 47 is disposed. Right armrest 47 is disposed laterally with respect to operator's seat 31. In the vehicular width direction (Y direction), right armrest 47 is disposed between operator's seat 31 and right console 41.

On the left side of operator's seat 31 in cab 9, a left console 44 is disposed. On left console 44, a lever for steering control of bulldozer 10 is provided. To left console 44, a steering control lever 45 is attached. Steering control lever 45 is disposed at a front portion of left console 44. A rear portion of left console 44 is provided to serve as a left armrest.

On the right side of operator's seat 31 in cab 9, a belt housing 35 for housing a seat belt is disposed. Belt housing 35 is disposed between operator's seat 31 and right armrest 47. On the left side of operator's seat 31 in cab 9, a latch portion 36 for latching the seat belt is disposed. Latch portion 36 is disposed between operator's seat 31 and left console 44. The seat belt is pulled from belt housing 35 and latching hardware at the leading end of the seat belt is engaged with latch portion 36 to place the seat belt on the waist of an operator sitting on operator's seat 31.

On the left side of operator's seat 31 in cab 9, a side shelf 55 is disposed. Side shelf 55 is disposed laterally with respect to operator's seat 31. On side shelf 55, a cup holder 56, an ashtray 57, a cigarette lighter 58, and an external connection terminal 59 are provided. Cup holder 56, ashtray 57, cigarette lighter 58, and external connection terminal 59 constitute a handled portion to be handled by an operator sitting on operator's seat 31.

The dot-and-dash line in FIG. 4 indicates a median line ML of operator's seat 31. The median line is a virtual line dividing operator's seat 31 into a right half and a left half. When operator's seat 31 is seen from the front, median line ML passes through the center in the lateral direction of operator's seat 31. When operator's seat 31 is seen from the back, median line ML passes through the center in the lateral direction of operator's seat 31. In the plan view shown in FIG. 4, median line ML passes through the center of operator's seat 31 and extends along the position dividing operator's seat 31 into equal parts.

In the case where operator's seat 31 is bilaterally symmetrical in shape, median line ML is located on the plane of symmetry. However, operator's seat 31 of the present embodiment may not be completely symmetrical. Median line ML may be a line dividing, into equal parts, a bilaterally symmetrical member which forms a part of operator's seat 31. Median line ML may also be a line dividing, into equal parts, a bilaterally symmetrical part of a member which forms a part of operator's seat 31. For example, median line ML may be a line dividing seat portion 32 into equal parts, a line dividing back portion 33 into equal parts, a line dividing a front surface 33a of the back portion into equal parts, or a line dividing headrest 34 into equal parts.

As shown in FIG. 4, median line ML of operator's seat 31 extends to incline with respect to the front-rear direction (X direction) of cab 9, so that median line Mt inclines rightward toward the front and inclines leftward toward the back. Operator's seat 31 is fixed in cab 9, so that a front edge FE of operator's seat 31 inclines rightward with respect to the front-rear direction (X direction) of cab 9 as seen in plan view. Front edge FE is a front end portion of operator's seat 31 and this front end portion is located on median line ML as seen in plan view.

A dash panel 46 is disposed frontward of operator's seat 31 in cab 9. Above dash panel 46, a monitor device 70 is disposed. The distance between dash panel 46 and front pillar 48 in the right-left direction is larger than the distance between dash panel 46 and front pillar 49 in the right-left direction. Dash panel 46 and monitor device 70 are disposed slightly to the right, relative to the center of cab 9 in the right-left direction.

Figure 5:
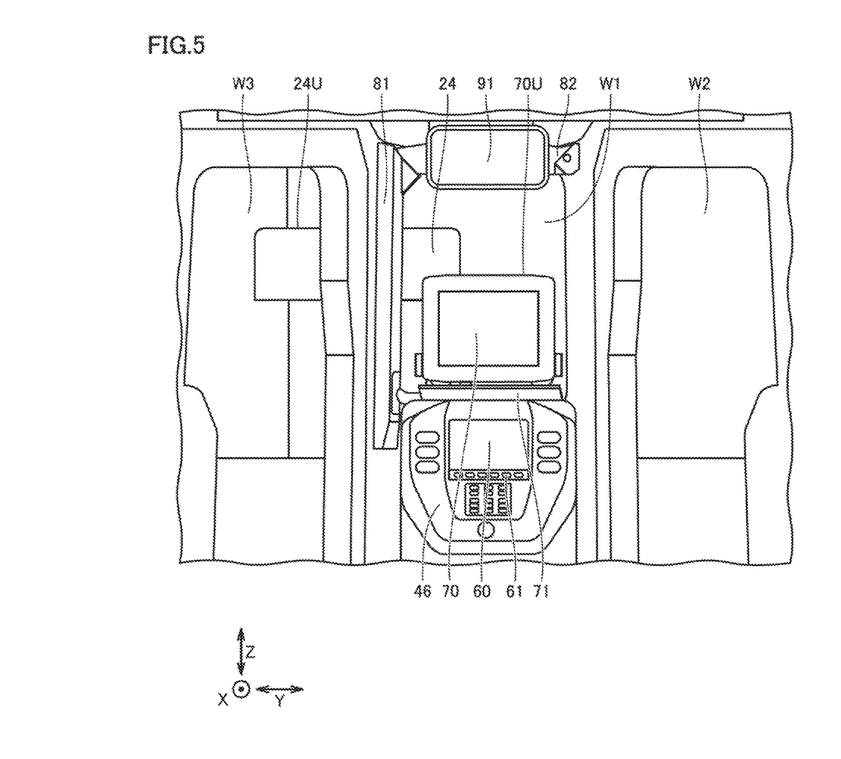
FIG. 5 is a schematic diagram as seen from an operator's seat in the cab in a frontward direction.

FIG. 5 is a schematic diagram as seen from operator's seat 31 in cab 9 in the frontward direction. As shown in FIG. 5, a display monitor (second monitor device) 60 and switches 61 for example are attached to dash panel 46. A control panel and gauges for example may also be attached to dash panel 46. The upper edge of dash panel 46 is located in the vicinity of the lower edge portion of first front window W1. Dash panel 46 may be disposed so that the upper edge of dash panel 46 slightly overlaps the lower edge portion of first front window W1 as seen in the front-rear direction, or may be disposed so that the upper edge of dash panel 46 does not overlap first front window W1.

Display monitor 60 and switches 61 attached to dash panel 46 face rearward. Display monitor 60 is disposed to face operator's seat 31, so that an operator sitting on operator's seat 31 can easily see display monitor 60. Switches 61 are disposed to face operator's seat 31, so that an operator sitting on operator's seat 31 can easily operate switches 61.

Display monitor 60 is a conventional monitor device corresponding to the display device disclosed in PTD 1. Display monitor 60 is a liquid crystal display for example. Display monitor 60 shows various kinds of information concerning bulldozer 10. The information shown on display monitor 60 may for example include coolant temperature of engine 21, hydraulic oil pressure, fuel consumption of engine 21, temperature of lubricating oil of engine 21, and the like. Display monitor 60 may also be configured so that information shown on display monitor 60 can be switched.

Monitor device 70 is a monitor for displaying information required for construction, such as externally acquired information about a designed landform and the current position of bulldozer 10 for example. Monitor device 70 has a flat front surface where a display surface is provided, and a rear surface opposite to the display surface. Monitor device 70 is disposed with its display surface facing operator's seat 31. The display surface of monitor device 70 is larger than the display surface of display monitor 60. Monitor device 70 is disposed above display monitor 60 as seen from operator's seat 31.

The display surface of monitor device 70 is disposed to be inclined with respect to the right-left direction. As shown in FIG. 4, the display surface of monitor device 70 is inclined rearward to the right. The angle at which monitor device 70 is inclined with respect to the right-left direction is smaller than the angle at which median line ML of operator's seat 31 is inclined with respect to the front-rear direction. Since monitor device 70 is disposed to be inclined, the display surface of monitor device 70 is easily viewable from an operator sitting on operator's seat 31 with median line ML inclined with respect to the front-rear direction.

To the upper surface of dash panel 46, a fixture member 71 in the shape of a flat plate is fixed with a plurality of bolts. To fixture member 71, two support members 73 are attached. Two support members 73 are arranged in the right-left direction with a distance therebetween. One end of each support member 73 is fixed to the upper surface of fixture member 71. The other end of each support member 73 is fixed to the rear surface of monitor device 70. A pair of support members 73 firmly supports monitor device 70. Therefore, even in the case where bulldozer 10 vibrates during a heavy-road work or traveling on a rough terrain, for example, positional displacement of monitor device 70 is suppressed.

Monitor device 70 is movable relative to dash panel 46 within a movable range defined by support members 73. Monitor device 70 of the present embodiment is pivotable with respect to dash panel 46 about one end of support member 73 along the front-rear direction, and pivotable with respect to support member 73 about the other end of support member 73 along the front-rear direction. The position of monitor device 70 can be adjusted so that the display surface is most easily viewable from an operator sitting on operator's seat 31. Since display monitor 60 is fixed to dash panel 46, display monitor 60 is not movable, in contrast to monitor device 70.

To the rear surface of monitor device 70, a wire harness 72 is connected. Wire harness 72 is an assembly made up of a bundle of a plurality of electric wires. Wire harness 72 includes an electric wire for supplying electric power to monitor device 70 and an electric wire for transmitting and receiving a signal between monitor device 70 and a controller (not shown). FIG. 4 shows only a part of wire harness 72 in the vicinity of its end coupled to monitor device 70.

FIG. 5 shows monitor device 70 seen in the frontward direction. As shown in FIG. 5, monitor device 70 is disposed to overlap first front window W1. When monitor device 70 is seen in the front-rear direction, the whole of monitor device 70 in the right-left direction overlaps first front window W1. Monitor device 70 is disposed at a position where the whole of monitor device 70 overlaps first front window W1, when monitor device 70 is seen in the front-rear direction.

Monitor device 70 has an upper edge 70U. Intake pipe 24 has an upper end 24U. As shown in FIG. 5, monitor device 70 overlaps intake pipe 24 when monitor device 70 inside cab 9 and intake pipe 24 outside cab 9 are seen in the front-rear direction with first front window WI of cab 9 therebetween. Upper edge 70U of monitor device 70 is located lower than upper end 24U of intake pipe 24.

First front window W1 has a pair of a right side edge and a left side edge. The right side edge of first front window W1 extends in the top-bottom direction along front pillar 48 shown in FIG. 4. The left side edge of first front window W1 extends in the top-bottom direction along front pillar 49 shown in FIG. 4. Along the left side edge of first front window W1, a cover member 81 is disposed. The upper edge of first front window W1 extends in the right-left direction. Along the upper edge of first front window W1, a cover member 82 is disposed. At a position overlapping the upper edge of first front window W1 as seen in the front-rear direction, a back mirror 91 is disposed for an operator sitting on operator's seat 31 to see rearward of bulldozer 10.

Figure 6:
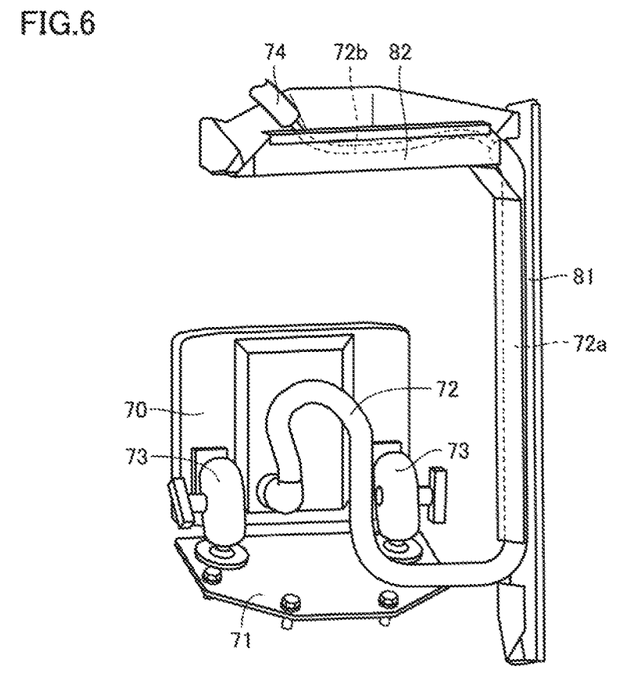
FIG. 6 is a schematic diagram showing an arrangement of a wire harness connected to a monitor device.

FIG. 6 is a schematic diagram showing an arrangement of wire harness 72 connected to monitor device 70. FIG. 6 shows an assembly including monitor device 70, and cover members 81, 82 attached along respective edges of first front window W1 of cab 9, as seen in the rearward direction. FIG. 6 does not show other components of cab 9, for the sake of clarifying the illustration.

As shown in FIG. 6, wire harness 72 connected to the rear surface of monitor device 70 has a portion (reference character 72a) extending along the left side edge of first front window W1, and a portion (reference character 72b) extending along the upper edge of first front window W1. Wire harness 72a is covered with cover member 81. Wire harness 72b is covered with cover member 82. Cover member 81 is fixed to a frame portion along the left side edge of first front window W1 with bolts. Cover member 82 is fixed to a frame portion along the upper edge of first front window W1 with bolts.

Wire harness 72 is connected to a wiring for cab 9. A connector 74 connecting the wiring for cab 9 to wire harness 72 is disposed at the upper edge of first front window W1. The connector is not disposed in the vicinity of the rear surface of monitor device 70, but disposed at the upper edge of first front window W1, to thereby enable the narrow space on dash panel 46 to be utilized effectively. Moreover, when wire harness 72 is routed, the curvature of a curve of wire harness 72 can be reduced. Connector 74 to which wire harness 72 is connected may be disposed inside cover member 82.

Figure 7:
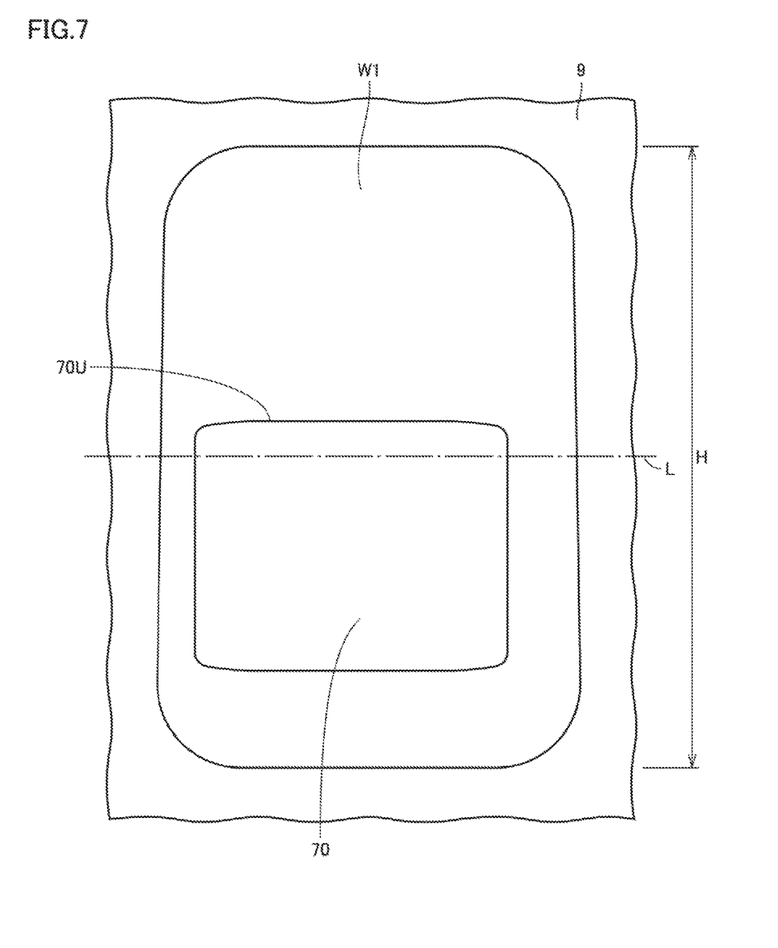
FIG. 7 is a schematic diagram of the monitor device as seen from outside the cab through a first front window.

FIG. 7 is a schematic diagram of monitor device 70 as seen from outside cab 9 through first front window W1. A height H shown in FIG. 7 represents the dimension of first front window W1 in the top-bottom direction. A center line L indicated by the dot-and-dash line in FIG. 7 represents the center in the top-bottom direction of first front window W1.

Monitor device 70 shown schematically in a substantially rectangular shape in FIG. 7 has upper edge 70U. As shown in FIG. 7, upper edge 70U of monitor device 70 is located higher than the center in the top-bottom direction of first front window W1, when monitor device 70 is seen in the front-rear direction.

Figure 8:
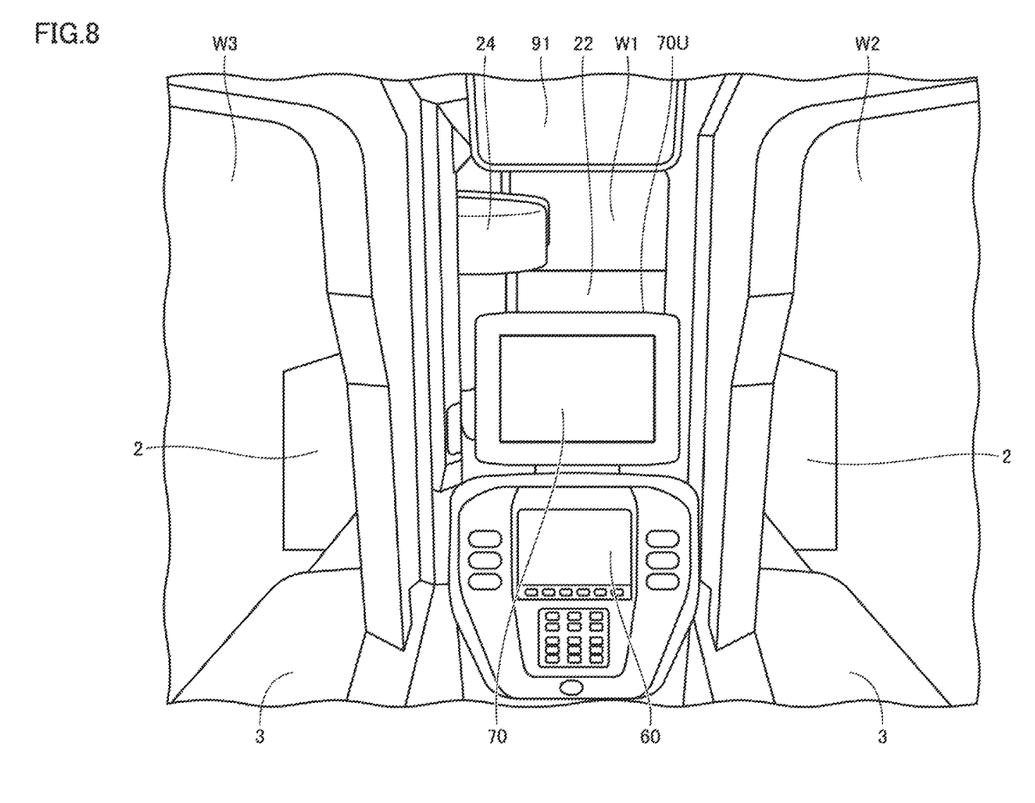
FIG. 8 is a schematic diagram as seen from the operator's seat in the cab in a frontward downward direction.

FIG. 8 is a schematic diagram as seen from operator's seat 31 in cab 9 in a frontward downward direction. FIG. 8 shows a field of view of an operator sitting on operator's seat 31 and casting eyes downward toward both the right end and the left end of blade 2. FIG. 8 does not show frame 4 and tilt cylinder 5 shown in FIGS. 1 and 2, for the sake of clarifying the illustration.

An operator can see, from inside cab 9, the right end of blade 2 through second front window W2 and the left end of blade 2 through third front window W3. During work by means of blade 2, the operator can watch the lower left end and the lower right end of blade 2 and their vicinities, through third front window W3 and second front window W2 respectively. During work, the operator can identify the landform around bulldozer 10, through second front window W2 and third front window W3.

As described above with reference to FIGS. 1 and 2, engine hood 22 is disposed frontward of cab 9. In the case where an operator sitting on operator's seat 31 sees the outside of cab 9 through first front window W1, the field of view of the operator is restricted by engine hood 22. Supposing that a virtual line connecting the viewpoint of the operator and the foremost end of engine hood 22 is a first line and a virtual line connecting the viewpoint of the operator and upper edge 70U of monitor device 70 is a second line, the second line is located lower than the first line. Therefore, monitor device 70 disposed above dash panel 46 does not interfere with the field of view of the operator seeing the outside of cab 9 through first front window W1.

Next, functions and effects of the present embodiment will be described.

As shown in FIG. 3, cab 9 of the present embodiment includes first front window W1 provided in a central part of the front portion of cab 9, second front window W2 provided to incline obliquely rearward to the right with respect to first front window W1, and third front window W3 provided to incline obliquely rearward to the left with respect to first front window W1. As shown in FIGS. 4 and 5, cab 9 further includes dash panel 46 disposed frontward of operator's seat 31 in cab 9, and monitor device 70 disposed above dash panel 46. As shown in FIG. 5, the whole of monitor device 70 in the right-left direction overlaps first front window W1 when monitor device 70 is seen in the front-rear direction. Monitor device 70 is disposed at a position at which the whole of monitor device 70 overlaps first front window WI when monitor device 70 is seen in the front-rear direction.

As shown in FIG. 8, an operator aboard cab 9 can see the right end of blade 2 through second front window W2 and see the left end of blade 2 through third front window W3. The operator can see both the right end and the left end of blade 2 as well as monitor device 70 with a small shift of the line of sight. Thus, during work by means of blade 2, the operator can easily see monitor device 70.

When monitor device 70 is seen in the front-rear direction, the whole of monitor device 70 in the right-left direction overlaps first front window W1, while monitor device 70 does not overlap second front window W2 and third front window W3. Therefore, when an operator is to see the right end of blade 2 through second front window W2 or see the left end of blade 2 through third front window W3, monitor device 70 will not interfere with the field of view of the operator. Moreover, monitor device 70 is disposed in a region in which engine hood 22 blocks the frontward field of view of an operator. Therefore, when an operator is to see frontward of cab 9 through first front window W1, monitor device 70 will not interfere with the field of view of the operator. Thus, monitor device 70 can additionally be installed in cab 9 without affecting the field of view of an operator.

Moreover, as shown in FIGS. 5 and 6, wire harness 72 is connected to monitor device 70 for supplying electric power and transmitting/receiving a signal. Wire harness 72 is disposed along the left side edge of first front window W1. Since wire harness 72 is disposed along the side edge of first front window W1, wire harness 72 does not interfere with the field of view of an operator. Thus, monitor device 70 can additionally be installed in cab 9 without affecting the field of view of an operator. Wire harness 72 may be disposed along the right side edge of first front window W1. Wire harness 72 may be disposed along one of the right and left side edges of first front window W1. Cover members 81, 82 covering wire harness 72 can be provided to make a most part of wire harness 72 invisible from an operator and accordingly improve the design. Cover members 81, 82 are fixed to the frame of first front window W1 with bolts, which facilitates work for disposing wire harness 72 in the condition where cover members 81, 82 are detached and attaching cover members 81, 82 after wire harness 72 is disposed.

Moreover, as shown in FIG. 7, upper edge 70U of monitor device 70 is located higher than the center of first front window W1 in the top-bottom direction. Even when monitor device 70 is disposed at a position where monitor device 70 overlaps the lower half of first front window W1, monitor device 70 will not interfere with the field of view of an operator who is to see the outside of cab 9 through first front window W1. Thus, large-sized monitor device 70 can additionally be installed in cab 9 without affecting the field of view of an operator.

Moreover, as shown in FIG. 5, dash panel 46 has a display monitor (second monitor device) 60. Since monitor device 70 is disposed above dash panel 46 and display monitor (second monitor device) 60 is provided on dash panel 46, an operator can see monitor device 70 and display monitor 60 with a small shift of the line of sight.

A work vehicle of the present embodiment includes intake pipe 24 located frontward of cab 9 and protruding upward from engine hood 22, as shown in FIGS. 1 and 2. As shown in FIG. 5, monitor device 70 overlaps intake pipe 24 as seen in the front-rear direction. Even when monitor device 70 is disposed at a position at which monitor device 70 overlaps intake pipe 24, monitor device 70 will not interfere with the field of view of an operator who is to see the outside of cab 9 through first front window W1. Thus, monitor device 70 having a large display surface can additionally be installed in cab 9 without affecting the field of view of an operator.

Moreover, as shown in FIG. 5, upper edge 70U of monitor device 70 is located lower than the upper end of intake pipe 24 when monitor device 70 is seen in the front-rear direction. The disposition of monitor device 70 is thus defined to avoid overlapping of monitor device 70 with the whole surface of first front window W1. Thus, the configuration is maintained in which an operator aboard cab 9 can see, through first front window W1, the outside located frontward of cab 9. Accordingly, the work environment for an operator in cab 9 can be prevented from deteriorating.

The above embodiment has been described regarding the example where cab 9 is mounted on bulldozer 10. Cab 9 of the embodiment as described above may also be mounted on any of other work vehicles such as motor grader, besides bulldozer 10.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 vehicular body; 2 blade; 8 engine compartment; 9 cab; 10 bulldozer; 21 engine; 22 engine hood; 24 intake pipe; 24IJ upper end; 31 operator's seat; 46 dash panel; 60 display monitor (second monitor device); 61 switches; 70 monitor device; 70U upper edge; 71 fixture member; 72 wire harness; 73 support member; 74 connector; 81, 82 cover member; H height; L center line; ML median line; W1 first front window; W2 second front window; W3 third front window

The invention claimed is:

1. A work vehicle comprising:
a cab, the cab including an operator's seat disposed in the cab, a first front window provided in a central part of a front portion of the cab, a second front window provided to incline obliquely rearward to right with respect to the first front window, a third front window provided to incline obliquely rearward to left with respect to the first front window, a dash panel disposed frontward of the operator's seat in the cab, and a monitor device disposed above the dash panel, a whole of the monitor device in a right-left direction overlapping the first front window when the monitor device is seen in a front-rear direction;
a work implement disposed frontward of the cab;
an engine;
an engine hood covering the engine; and
an intake pipe for intake air to flow in the intake pipe toward the engine, wherein
the intake pipe is located frontward of the cab and protrudes upward from the engine hood, and
the monitor device overlaps the intake pipe as seen in a front-rear direction.

2. The work vehicle according to claim 1, wherein an upper edge of the monitor device is located lower than an upper end of the intake pipe.

3. The work vehicle according to claim 1, wherein the monitor device is disposed at a position at which a whole of the monitor device overlaps the first front window when the monitor device is seen in the front-rear direction.

4. The work vehicle according to claim 1, wherein
the first front window includes a pair of a right side edge and a left side edge each extending in a top-bottom direction,
the cab further comprises a wire harness connected to the monitor device, and
the wire harness is disposed along one of the right side edge and the left side edge.

5. The work vehicle according to claim 1, wherein an upper edge of the monitor device is located higher than a center of the first front window in a top-bottom direction.

6. The work vehicle according to claim 1, wherein the dash panel includes a second monitor device.

* * * * *